(No Model.)
T. A. MARTIN.
SHEARING AND CLIPPING MACHINE.
No. 399,763.  Patented Mar. 19, 1889.
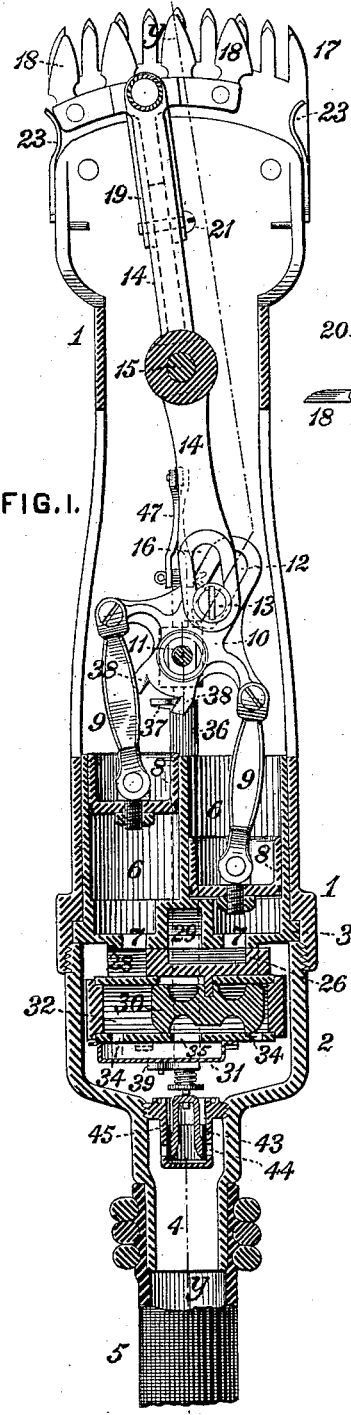
FIG. 1.
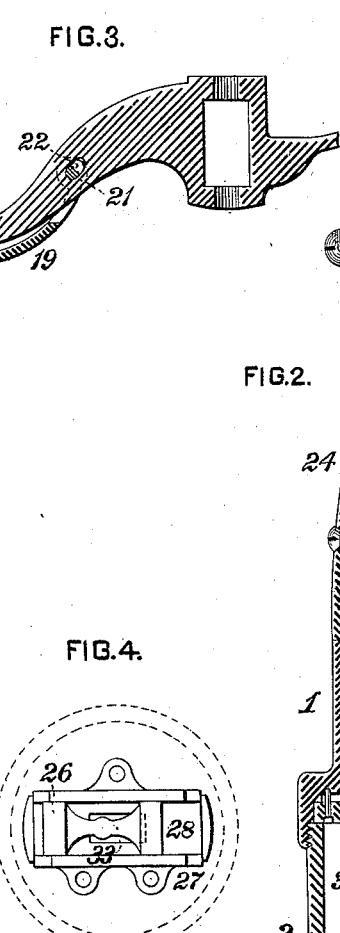
FIG. 3.
FIG. 4.
FIG. 5.
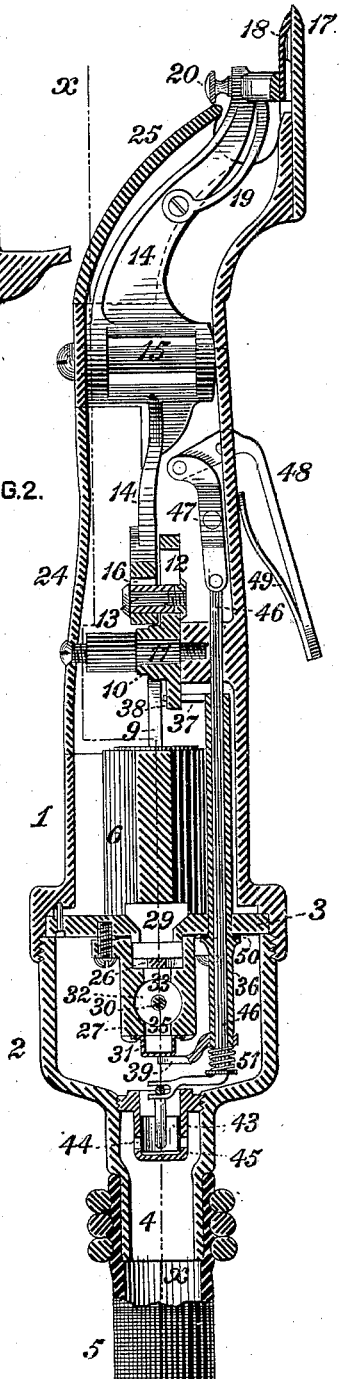
FIG. 2.
WITNESSES:
E. Newell.
F. E. Gaither.
INVENTOR,
T. Arthur Martin,
by J. Snowden Bell, Att'y.

UNITED STATES PATENT OFFICE.

THOMAS ARTHUR MARTIN, OF BRAINERD, MINNESOTA.

SHEARING AND CLIPPING MACHINE.

SPECIFICATION forming part of Letters Patent No. 399,763, dated March 19, 1889.

Application filed October 1, 1888. Serial No. 286,824. (No model.)

*To all whom it may concern:*

Be it known that I, THOMAS ARTHUR MARTIN, of Brainerd, in the county of Crow Wing and State of Minnesota, have invented certain new and useful Improvements in Shearing and Clipping Machines, of which improvements the following is a specification.

My invention relates to machines for shearing or clipping wool or hair of the class in which the cutters are actuated by a fluid-pressure motor; and its object is to provide a machine of such character which shall be simple, compact, and conveniently portable in its construction, and which may be operated at high speed, controllable as desired, without liability to objectionable wear or derangement of its working parts.

To this end my improvements consist in certain novel devices and combinations hereinafter fully set forth.

In the accompanying drawings, Figure 1 is a longitudinal section through a machine embodying my invention at the line $x\ x$ of Fig. 2; Fig. 2, a similar section with the cap-plate removed at the line $y\ y$ of Fig. 1; Fig. 3, a similar section through the upper arm of the cutter-lever and the cutter-carrier; Fig. 4, a plan or top view of the main valve and valve-chest, and Fig. 5 a bottom view of the valve-chest.

In the practice of my invention I provide a casing or tubular handle, 1, which incloses and supports the operative mechanism and is of dimensions proper to enable it to be held and guided in different positions by the operator. Access is afforded to the interior of the casing by a removable back plate, 24, and cap-plate 25. A fluid-supply chamber, 2, is secured, preferably by a screw-thread, to one end of the handle 1, communication between the supply-chamber and handle being closed by an interposed end plate, 3, making a tight joint therewith. The end plate, 3, may be either secured removably to the handle or be held in position by the engagement of the supply-chamber therewith, a guide pin or pins being provided in the latter case to insure its proper adjustment. The supply-chamber is provided at its end opposite that which is connected with the handle with a tubular extension, 4, to which is connected a flexible supply-pipe, 5, through which the motive fluid, which is preferably air under pressure, passes from a suitable receptacle or generator, as an air reservoir or compressor, to actuate the pistons of the motor-cylinders 6, and is thereafter exhausted into the atmosphere through the opposite end of the handle, as presently to be described.

Two single-acting motor-cylinders 6 are fixed side by side upon the end plate, 3, of the handle, preferably by being cast integral therewith, and project therefrom into the handle, each of said cylinders being open at one end to the handle and closed at the other by the plate 3, in which are formed two ports, 7, each opening into one of the cylinders. Pistons 8, fitting truly in the cylinders 6, are coupled by connecting-rods 9 to the opposite arms of a rocking lever, 10, which is journaled upon and adapted to vibrate about the axis of a bearing-pin, 11, secured to the handle 1. A central arm formed upon the rocking lever 10, perpendicular to a line joining the centers of the connecting-rod pivots, is provided with a longitudinal slot, 12, in which is secured adjustably a coupling-pin, 13, which connects the rocking lever with a cutter-lever, 14, pivoted on a bearing-pin, 15, fixed to the handle 1.

The coupling-pin 13 passes through a longitudinal slot, 16, in the adjacent end of the cutter-lever 14, said slot, together with the corresponding slot of the rocking lever 10, enabling the throw of the cutter-lever to be adjusted in accurate conformity to the stroke of the pistons 8.

A fixed cutter or comb, 17, composed of a series of blades or fingers having a cutting-edge on each side, is secured upon one side of the handle 1 at the end opposite that to which the supply-chamber 3 is attached, and a vibrating cutter, 18, having a series of suitably-shaped double-edged shearing-blades, is secured to a carrier, 19, which is pivoted to the forward or outer arm of the cutter-lever 14 in such position as to enable the edges of the blades of the vibrating cutter 18 to traverse in proper relation to the edges of the fixed cutter-blades to effect a shearing cut upon interposed material. The bearing of the vibrating cutter against the fixed cutter is adjusted as required by a set-screw, 20, engaging a female thread in the cutter-lever 14 and bearing against the cutter-carrier 19, and the pivot 21, by which said carrier is coupled to the cutter-lever 14, passes freely through an inclined slot, 22, in the latter. The bearing of the pivot in the slot is such that the vibrating cutter is thrown forward when no resistance is presented, thereby relieving the blades from wear, while in cutting the resistance of the material presses the vibrating cutter backward, thus holding it firmly to its work. Cushion-springs 23 are secured to the handle 1 in such position that the vibrating cutter, or the cutter-lever by which it is moved, may at each extremity of its traverse abut against one of said springs, the tension of which acts in the direction of and facilitates the opposite movement of the lever, thus tending to prevent stoppage when the pistons are at the ends of their respective strokes.

Motive fluid is admitted to and exhausted from the cylinders 6 by a valve mechanism, which is of the following construction: A main or distribution slide-valve, 26, is fitted to reciprocate freely transversely to the axes of the motor-cylinders 6 in a valve-chest, 27, secured to the base-plate 3 within the fluid-supply chamber 2. The main valve 26 works in a rectangular passage or channel, 28, in the valve-chest, which passage is open at each end to the supply-chamber and controls the cylinder-ports 7 and an intermediate exhaust-port, 29, formed in the cylinder end plate, 3, and establishing communication between the central cavity of the main valve 26 and the interior of the handle 1. The main valve is slightly tapered, so that it may be tightened as required by the removal of a thin packing interposed between the valve-chest and plate 3, and, being substantially balanced, its resistance is limited to its friction, and it is consequently extremely sensitive in action.

In the reciprocating movements of the main valve each of the cylinder-ports 7 is alternately placed in communication with the supply-chamber through the adjacent open end of the passage 28 and with the exhaust-port 29 through the cavity of the valve, motive-fluid being thus alternately admitted from the supply-chamber to the pistons and exhausted from the pistons to the atmosphere through the exhaust-port and handle, being discharged at the open end of the latter adjacent to the cutters, so as to carry off fine dust and clippings therefrom and prevent the access of the same to the interior of the handle and the contained working parts. The reciprocation of the main valve 26 is effected by a piston, 30, actuated by fluid-pressure from the supply-chamber, motive-fluid being alternately admitted to and exhausted from opposite ends of the piston 30 by a supplemental valve, 31, which is reciprocated by the vibrating lever 10, to which the pistons 6 are connected.

The piston 30 is fitted to slide freely, parallel with the main valve, in a cylindrical chamber, 32, formed in the valve-chest, and having its ends closed by suitable heads or caps, and is coupled to the main valve 26 by a tongue or projection on the latter, which passes through a port, 33, in the wall of the chamber 32, adjoining the passage 28, in which the main valve 26 works, and engages a central recess in the piston 30. The port 33 is constantly in communication with the exhaust-port 29, the valve 26 being laterally recessed at its central portion, as shown in Figs. 2 and 4, for that purpose, and the piston 30 is reduced in diameter between its ends or heads to enable the motive-fluid by which it has been moved in either direction to be thereafter exhausted through the ports 33 and 29. Ports 34 at the ends of the piston-chamber 32 serve to admit motive-fluid thereto from the supply-chamber on opposite ends of the piston 30 as said ports are alternately uncovered by the supplemental valve 31, which works over a face on the lower wall of the valve-chest in which the ports 34 are formed, and a central exhaust-port, 35, is alternately put in communication with one or the other of the supply-ports 34 through the cavity of the supplemental valve 31 in the movements of the latter. The port 35 opens into the piston-chamber between the heads of the piston 30, so that motive-fluid passing through the port 35 will be exhausted through the constantly-communicating ports 33 and 29.

A tubular valve-stem, 36, is journaled in a bearing in the end plate, 3, parallel with the axes of the cylinders 6, and is provided with an arm, 37, on its forward or outer end, said arm being alternately moved in opposite directions by tappets 38, projecting from the rocking arm 10, to which the pistons 6 are connected below the axis of the bearing-pin 11 of the rocking arm. An arm, 39, fixed upon the opposite end of the valve-stem, is coupled to the supplemental valve 31, the connection being effected by a pin, 40, on the valve, which enters a longitudinal slot, 41, in the arm. The valve 31, being fitted to work between lugs or guides 42 on the face over which it travels, is reciprocated thereon by the vibrating movements imparted to the valve-stem 36 by the vibrating lever 10 through the tappets 38 and valve-stem arm 37.

The speed of the vibrating cutter 18 is varied and controlled by the operator, as desired, by means of a regulating or throttle valve, 43, which governs a series of induction ports or openings, 44, in a cylindrical casing, 45, communicating with the supply-chamber 2 and interposed between the same and the extension or nozzle 4 thereof, to which the supply-pipe 5 is connected. The valve 43 is coupled to a stem, 46, which passes freely through the tubular valve-stem 36 and is coupled at its forward end by a link, 47, to a lever, 48, which is pivoted to the handle 1, and projects downwardly and outwardly therefrom. The regulating-valve is held normally to its seat to close the ports 44 by a spring, 49, bearing against the outside of the handle 1 and against the lever 46. The joint between the valve-stem 36 and the plate 3 is made tight by a ring or washer, 50, of suitable packing, interposed between the plate 3 and a collar on the tubular valve-stem 36, a helical spring, 51, bearing against the end of the valve-stem 36 and against a collar on the valve-stem 46, acting to compress the washer 50 and maintain proper tightness of the joint thereat.

In operation the machine is held and guided by the handle 1, and the speed of the cutter is graduated to the requirements of the work by proper manipulation of the lever 48 of the regulating-valve. In the position shown in the drawings motive-fluid from the supply-chamber enters the piston-chamber 32 through the right-hand supply-port 34 and throws the piston 30 and the connected main valve 26 to the left, thereby opening the port 7 of the right-hand motor-cylinder 6 to the supply-chamber through the valve-passage 28, and opening the corresponding port of the left-hand cylinder to the exhaust-port 29 through the cavity of the valve 26. This movement of the main valve effects the upward stroke of the right-hand piston 8, (which, through the rocking lever 10 and cutter-lever 14, vibrates the cutter 18 to the right,) and simultaneously exhausts the motive-fluid which has effected the preceding upward stroke of the left-hand piston through the port 29 and the open end of the handle. In the concluding movement of the vibrating arm 10 the left-hand tappet 38 thereof strikes the arm 37 of the valve-stem 36, and through said valve-stem throws the supplemental valve 31 to the right, admitting motive-fluid to the valve-chamber 32 through the left-hand supply-port 34, and thereby throwing the piston 30 to the right. Such movement of the piston 30 effects the upward movement of the left-hand piston 6 and the exhaust of the right-hand piston, and thereby vibrates the cutter 18 to the left, the motive-fluid which has effected the preceding left-hand stroke of the piston 30 being simultaneously exhausted through the ports 33 and 29.

The machine is conveniently handled and may be operated at high speed without tendency to breakage or derangement of its working parts, which are readily accessible by the removal of the cover and cap-plates and detachment of the supply-chamber for examination and oiling or for renewal when so far worn as to render the same necessary or desirable.

I claim as my invention and desire to secure by Letters Patent—

1. The combination of a tubular handle or casing, a cutter-lever pivoted thereto, a removable end plate connected to and closing one end of the handle, and a fluid-pressure motor secured to said end plate and having a piston or pistons coupled to the cutter-lever, substantially as set forth.

2. The combination of a tubular handle or casing which is open at one of its ends, an end plate connected to and closing the opposite end of the handle, a cutter fitted to vibrate adjacent to the open end of the handle, and a fluid-pressure motor fixed to the end plate within the handle and having one or more pistons coupled to and actuating the cutter, and an exhaust-port for the discharge of motive-fluid into and through an open end of the handle, substantially as set forth.

3. The combination of a tubular handle or casing, a fluid-supply chamber connected thereto, an end plate interposed and fixed in position between the handle and supply-chamber, a cylinder fixed to said end plate within the handle and having its piston connected to a cutter-lever pivoted thereto, a valve-chest secured to the end plate within the supply-chamber, and a main or distribution valve working in said chest and governing the supply and exhaust of motive-fluid to and from the piston, substantially as set forth.

4. The combination of a handle or casing, a cylinder fixed thereto, a vibrating lever pivoted thereto and provided with a longitudinal slot, a piston fitting the cylinder and coupled to said vibrating lever, a cutter-lever pivoted to the handle and having a longitudinal slot in its arm adjacent to the vibrating lever, and a coupling-pin passing through the slot of the cutter-lever and secured adjustably in the slot of the vibrating lever, substantially as set forth.

5. The combination of a handle or casing, a fixed cutter or comb secured thereto, a cutter-lever pivoted thereto, a cutter-carrier pivoted to said lever by a pin passing through a slotted hole therein, and a vibrating cutter secured to the free end of said carrier, substantially as set forth.

6. The combination of a handle or casing, a fixed cutter or comb secured thereto, a cutter-lever pivoted thereto, a cutter-carrier pivoted to the cutter-lever, a vibrating cutter secured to the free end of said carrier, and an adjusting-screw engaging a female thread in the cutter-lever and adapted to bear on the cutter-carrier, substantially as set forth.

7. The combination of a handle or casing, a cutter-lever pivoted thereto, a fluid-pressure motor secured thereto and having a piston or pistons coupled to the cutter-lever, and cushion-springs connected to the handle in position to bear against the cutter-lever at the opposite terminals of its traverse, substantially as set forth.

8. The combination of a handle or casing, a cylinder fixed thereto, a vibrating lever pivoted thereto, a piston fitting the cylinder and coupled to said vibrating lever, a main valve governing the supply and exhaust of motive-fluid to and from the cylinder, a valve-piston coupled to and actuating said main valve, and a supplemental valve actuated by the vibrating lever and effecting the supply and exhaust of motive-fluid to and from the valve-piston, substantially as set forth.

9. The combination of a handle or casing, a fluid-supply chamber connected thereto, an end plate interposed and fixed in position between the handle and supply-chamber, and having an exhaust-port leading from the chamber to the handle, a cylinder fixed to the end plate within the handle, a vibrating lever pivoted to the handle, a piston fitting the cylinder and coupled to said vibrating lever, a main or distribution valve working in the supply-chamber and controlling a supply-port in the cylinder and the exhaust-port of the end plate, a valve-piston working in a closed chamber within the supply-chamber and coupled to the main valve, a supplemental valve controlling the supply of motive-fluid to the valve-piston and its exhaust therefrom through the exhaust-port of the end plate, and a valve-stem coupled to the supplemental valve, said stem passing freely through the end plate and being adapted to be rocked in its bearing by the movements of the vibrating lever, substantially as set forth.

10. The combination of a handle or casing, a fixed cutter or comb secured thereto at one of its ends, a cutter-lever pivoted thereto and carrying a movable cutter, a pair of motor-cylinders fixed to the handle, a vibrating lever pivoted to the handle and having opposite arms coupled to pistons working in the motor-cylinders, and a pin coupling the cutter-lever to the vibrating lever between the piston-connections of said vibrating lever, substantially as set forth.

11. The combination of the handle, the end plate, the supply-chamber provided with induction-ports, the tubular valve-stem passing through the end plate, the regulating-valve controlling the induction-ports, and having a stem passing through the tubular valve-stem, and the valve-lever coupled to the handle and to the regulating valve-stem, substantially as set forth.

THOMAS ARTHUR MARTIN.

Witnesses:
WALTER DAVIS,
N. W. WHEATLEY.